No. 845,831. PATENTED MAR. 5, 1907.
T. S. WATSON.
MOTOR CONTROLLER.
APPLICATION FILED JULY 12, 1906.
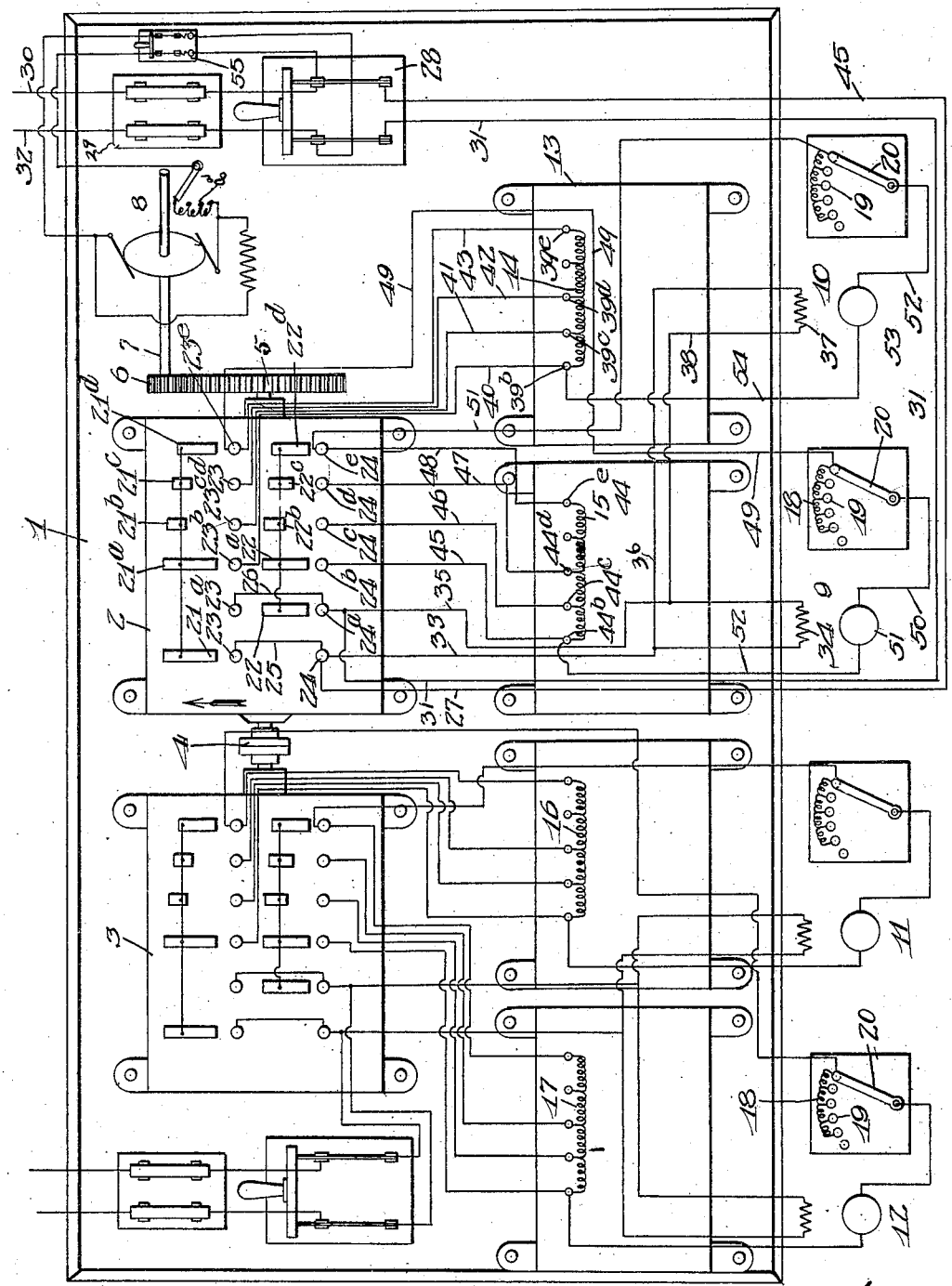
Witnesses:
Robert H. Weir
M. Perry Hahn
Inventor:
T. S. Watson
By Jones & Addington
Attys

UNITED STATES PATENT OFFICE.

THOMAS S. WATSON, OF MILWAUKEE, WISCONSIN.

MOTOR-CONTROLLER.

No. 845,831.　　　　　Specification of Letters Patent.　　　Patented March 5, 1907.

Application filed July 12, 1906. Serial No. 325,847.

*To all whom it may concern:*

Be it known that I, THOMAS S. WATSON, a citizen of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

My invention relates to improvements in motor-controllers, my object being to provide an improved form of controller and regulator for electric motors which shall be adapted to control one or a plurality of motors.

One of the objects of my invention is to provide a controller which shall automatically at predetermined intervals reverse the direction in which the motor is running and which is operated by means independent of the motor.

Another object of my invention is to provide a controller which shall while periodically reversing the direction of operation of the motor at the same time insert each time the motor is started in a reverse direction a certain amount of resistance in circuit therewith to prevent a sudden rush of current to the motor, this resistance being arranged to be gradually cut out to permit the motor to attain full speed.

Another object of my invention is to provide, in addition to a controller which shall automatically reverse the direction of operation of the motor, means for starting and stopping the motor independently of the reversing-controller.

I have illustrated my invention in the accompanying drawing, which is a diagrammatic view of my preferred construction.

In the construction illustrated in the drawing, which is adapted for controlling four motors, I mount upon a suitable base or support 1 two drum-controllers 2 and 3, which are suitably connected together by means of a coupling 4. Mounted upon the shaft of the controller 2 is a gear-wheel 5, which is arranged to mesh with a pinion 6, mounted upon the shaft 7 of a motor 8. The controller 2 is arranged to control the direction of operation of the motors 9 and 10, and controller 3 is arranged to control the direction of operation of the motors 11 and 12.

In addition to the controllers 2 and 3, I preferably mount upon the same base a resistance-box 13, which carries resistance-coils 14, 15, 16, and 17, arranged in circuit with motors 9 and 10, 12 and 11, respectively. Each one of the motors 9, 10, 11, and 12 is provided with a starting-box having a resistance 18, sections of which are arranged to be connected with contacts 19, over which is arranged to sweep a controlling-arm 20. The motor 8 is preferably provided with a variable resistance $8^a$, by which the speed thereof is controlled, and may be mounted upon the base 1, if so desired.

Inasmuch as the connections and arrangements of circuit for each of the controllers 2 and 3 are the same, it will only be necessary for me to describe one of the same, and I will therefore only refer to the construction and arrangement of the controller 2 and the motors to which it is connected. The reversing-controller 2 is rotated continuously in one direction by the motor 8 and is provided with two sets of contacts 21, $21^a$, $21^b$, $21^c$, $21^d$, 22, $22^a$, $22^b$, $22^c$, and $22^d$. The contacts 21 to $21^d$ are arranged as shown and are all electrically connected. Contacts 22 to $22^d$ are all electrically connected and are arranged as shown. The controller is also provided with two sets of stationary brushes, numbered 23, $23^a$, $23^b$, $23^c$, $23^d$, and $23^e$, and 24, $24^a$, $24^b$, $24^c$, $24^d$, and $24^e$. The brushes 23 and 24 are electrically connected by conductor 25, and the brushes $23^a$ and $24^a$ are electrically connected by conductor 26. The brush 24 is connected by a conductor 27, through the knife-switch 28 and the blow-out fuses 29, with one side 30 of the main circuit. Brush $24^a$ is connected by conductor 31 through the knife-switch 28 and blow-out fuse 29 with the opposite side 32 of the circuit. The brush 24 is also connected by conductor 33 with one terminal of the field-winding 34 of the motor 9, the other terminal of which is connected by conductor 35 with the brush $24^a$. A branch conductor 36 is connected with one terminal of the field-winding 37 of the motor 10, the opposite terminal of said field-winding being connected by a conductor 38 with the conductor 35. The resistance 14 is divided in sections, each section being connected to binding-posts numbered $39^b$, $39^c$, $39^d$, and $39^e$, which are in turn connected with brushes $23^b$, $23^c$, 23$^d$, and 23$^e$, respectively, by conductors 40, 41, 42, and 43. The resistance 15 is divided in sections connected with binding-posts 44$^b$, 44$^c$, 44$^d$, and 44$^e$, which in turn are connected with the brushes 24$^b$, 24$^c$, 24$^d$ and 24$^e$ by conductors 45, 46, 47, and 48, respectively. Brush 23$^e$ is connected by conductor 49 with the last of the contacts 19 of the starting-box for the motor 9. The movable member of said starting-box is connected by conductor 50 with one terminal of the armature 51, the opposite terminal of which is connected by conductor 52 with the binding-post 44$^b$. The brush 24$^e$ is connected by conductor 51 with the last of the contacts 19 of the starting-box for the motor 10, the arm 20 of which is connected by conductor 52 with one terminal of the armature 53 of the motor 10, the opposite terminal of which is connected by conductor 54 with the binding-post 39$^b$ of the resistance 14. The motor 8 is permanently connected with the mains 30 and 32 and is controlled by a switch 55, which is independent of the switch 28, whereby the motor 8 may be run independently of the motors 9 and 10, 11 and 12.

The operation of the device is as follows: When the switch 55 is closed, circuit is closed through the motor 8, which is started and rotates the drum-controller 2. The circuit of the motors desired to be started may be closed through the agency of the starting-box, and we will assume for the purpose of explanation that the motors 9 and 10 have been started by moving the movable member 20 of the starting-box to the extreme right, thereby cutting out the resistance 18 from the circuit thereof. The motors having thus been started, with the drum 2 rotating in the direction of the arrow, contacts 22 and 22$^a$ will engage the brushes 23$^a$ and 23$^b$, and at the same time contacts 21 and 21$^a$ will engage the brushes 24 and 24$^b$. Under these conditions the circuit will be closed as follows: from main 30, by conductor 45, to brush 24, thence to contact 21, from contact 21 to contact 21$^a$, brush 24$^b$, conductor 45, through the resistance 15, by conducter 48, to brush 24$^e$, thence by conductor 51, through the starting-box of the motor 10, by conductor 52, through the armature 53 of the motor 10, by conductors 54 and 40 to brush 23$^b$, from brush 23$^b$ to contact 22$^a$, thence to contact 22, brush 24$^a$, and by conductor 31 to the opposite main 32 of the circuit. At the same time a branch circuit is established from the binding-post 44$^b$, through the conductor 52, through the armature 51 of the motor 9, thence by conductor 50, through the starting-box of the motor 9, thence by the conductor 49 to the brush 23$^e$, conductor 43, through the resistance 14, by conductor 40 to brush 23$^b$, contact 22$^a$ to contact 22, and brush 24$^a$, thence by conductor 31 to the opposite side 32 of the circuit. As the drum continues to revolve the contacts 21$^b$, 21$^c$, and 21$^d$ will respectively engage brushes 24$^c$, 24$^d$, and 24$^e$, and contacts 22$^b$, 22$^c$, and 22$^d$ will respectively engage contact-brushes 23$^c$, 23$^d$ 23$^e$, thereby cutting out, as each contact engages a brush, a section of the resistances 14 and 15 from the respective motors, and the motors will build up in speed until they are finally running at full speed. A continued rotation of the drum causes the contacts 22 to 22$^d$ to pass off of brushes 23$^a$ to 23$^e$ and engage brushes 24$^a$ to 24$^e$, while the contacts 21 to 22$^d$ will respectively engage the brushes 23, 23$^b$, to 23$^e$. Assuming for the purpose of illustration that the contacts 21 and 21$^a$ have engaged the brushes 23 and 23$^b$ and the contacts 22 and 22$^a$ have engaged brushes 24$^a$ and 24$^b$, then the circuit through the motors will be reversed with all resistance 14 and 15 in circuit, and as the drum continues to rotate the resistance will be gradually cut out until the motors are running full speed in the reverse direction. The field-circuits of the motors 9 and 10 are always the same, conductor 33 being connected permanently to brush 24 and conductor 35 being connected permanently to brush 24$^a$. By this arrangement the field-circuit will always be by conductor 33 through the field 34 of the motor 9, thence by conductor 35 back to the brush 38. The conductors 33 and 35 are connected, respectively, with the conductors 36 and 38 and also connect the field 55 of the motor 10 in circuit.

The controller 2, which controls the motors 12 and 13, operates similarly to the manner in which the controller 2 operates, and it is therefore unnecessary to describe the operation thereof. If desired, an additional number of controllers may be connected with the controllers 2 and 3 in the same manner as they are here shown connected, and an additional number of motors may be controlled, if so desired. It will be noted that I have provided a source of power independent of the operating-motors for operating a controller, which intermittently reverses the direction of the motors. It will also be noted that I have provided means for stopping and starting the motors independently of the controller 2 and which will be operative no matter what position the controller 2 may be occupying.

Having thus described my invention, what I claim as new, and desire to secure by Letters Patent, is—

1. The combination with an electric motor, of a controller therefor for intermittently changing the direction of current in one of the elements of said motor, and means independent of said motor for operating said controller continuously.

2. The combination with an electric motor, of an automatic controller operated independently of said motor for intermittently changing the direction of current through one element thereof, resistance in circuit with said motor arranged to be inserted and gradually cut out upon each reversal of the motor.

3. The combination with an electric motor, of an automatic controller therefor for intermittently changing the direction of operation of the same, and a starting-box for said motor operative independently of said reversing-controller.

4. The combination with a motor, of a controller therefor for intermittently changing the direction of operation thereof, suitable resistance in the motor-circuit arranged to be inserted and gradually cut out upon each change of direction of operation, and a starting-box for said motor operative independently of said controller.

5. The combination with a plurality of electric motors, of a continuously-operated common controller therefor for intermittently changing the direction of current in one of the elements of said motors, and means independent of said motors for operating said controller.

6. The combination with a plurality of electric motors, of a continuously-operated common controller for intermittently changing the direction of current through one element of said motors, and a resistance in circuit with each of said motors arranged to be inserted and gradually cut out upon each change of direction of operation thereof.

7. The combination with a plurality of electric motors, of a common controller therefor for intermittently changing the direction of operation of the same, and a starting-box for each of said motors operative independently of said controller and of the starting-box for the other motor.

8. The combination with a plurality of motors, of a common controller therefor for intermittently changing the direction of operation thereof, resistance in each of said motor-circuits arranged to be inserted and gradually cut out upon each change of direction of operation of the motors, and a starting-box for each of said motors operative independently of said controller and independently of the starting-box of the other motor.

9. The combination with a plurality of electric motors, of a common controller for intermittently changing the direction of current through one element thereof, resistance in circuit with each of said motors arranged to be inserted and gradually cut out upon each change of direction of operation of the motors, and means independent of said motors for continuously operating said controller.

10. The combination with a plurality of electric motors, of a common controller therefor for intermittently changing the direction of current in one element of said motors, and an electric motor for operating said controller continuously.

11. The combination with a plurality of electric motors, of a single drum-controller therefor, and a resistance arranged in circuit with each of said motors, said controller being arranged to alternately change the direction of current in one of the elements of said motors, and upon each change of direction of current to insert and gradually cut out the resistance from the circuit of said motors.

12. The combination with a plurality of motors arranged in groups, a controller for each of said groups for intermittently changing the direction of current in one element of the motors, and a common means independent of the motors for operating all of said controllers.

13. The combination with a plurality of electric motors, of a common controller therefor for intermittently changing the direction of operation of said motors, an electric motor for operating said controller continuously, and means for varying the speed of said motor.

14. The combination with a plurality of motors, of a controller therefor for intermittently changing the direction of operation of said motors, an electric motor for operating said controller, and a variable resistance in circuit with said motor.

15. The combination with an electric motor, of an automatically-operated rotating drum-controller having contacts thereon for intermittently changing the direction of current in one of the elements of the motor, and means independent of said motor for rotating said controller.

16. The combination with a motor, of resistance in circuit therewith, a rotating drum-controller for intermittently changing the direction of current through one element of said motor and for inserting and gradually cutting out said resistance upon each reversal of the motor, and a motor independent of the first-mentioned motor for rotating said controller.

17. The combination with a plurality of electric motors, of a common rotating drum-controller therefor having contacts therein arranged to intermittently change the direction of current in one of the elements of said motor and a motor independent of said first-mentioned motor for continuously operating said controller.

18. The combination with a plurality of electric motors, of a resistance in circuit with each of said motors, a common rotating drum-controller for intermittently changing the direction of current of said motors and for inserting and gradually cutting out said resistance upon each change of direction of operation of the motors.

In witness whereof I have hereunto subscribed my name in the presence of two witnesses.

THOMAS S. WATSON.

Witnesses:
F. H. PETRIE,
O. F. PIHL, Jr.